(12) United States Patent
Cehelnik

(10) Patent No.: US 7,242,298 B2
(45) Date of Patent: Jul. 10, 2007

(54) METHOD AND APPARATUS FOR DETECTING CHARGE AND PROXIMITY

(76) Inventor: Thomas G. Cehelnik, P.O. Box 4278, Middletown, RI (US) 02842

( * ) Notice: Subject to any disclaimer, the term of this patent is extended or adjusted under 35 U.S.C. 154(b) by 48 days.

(21) Appl. No.: 10/978,142

(22) Filed: Oct. 29, 2004

(65) Prior Publication Data

US 2006/0092022 A1    May 4, 2006

Related U.S. Application Data

(63) Continuation of application No. 10/772,908, filed on Feb. 5, 2004, now Pat. No. 7,078,911.

(60) Provisional application No. 60/515,844, filed on Oct. 30, 2003, provisional application No. 60/445,548, filed on Feb. 6, 2003.

(51) Int. Cl.
*G08B 13/00* (2006.01)

(52) U.S. Cl. .................................. 340/566; 340/686.6

(58) Field of Classification Search ................ 340/561, 340/565, 600, 686.6, 573.1, 562, 566, 686.1; 250/336.1; 324/457
See application file for complete search history.

(56) References Cited

U.S. PATENT DOCUMENTS

| | | | | |
|---|---|---|---|---|
| 6,025,726 A | * | 2/2000 | Gershenfeld et al. | 324/671 |
| 6,150,945 A | * | 11/2000 | Wilson | 340/661 |
| 6,333,691 B1 | * | 12/2001 | Janus | 340/552 |
| 6,859,141 B1 | * | 2/2005 | Van Schyndel et al. | 340/562 |

OTHER PUBLICATIONS

Morse, Philip M, et al, Methods of Theoretical Physics, Part II: Chapters 9 to 13, McGraw-Hill Book Company, Inc., 1953.
Seo, Jin Keun, et al, Electrical Impedance Tomography for Imaging and Lesion Estimation, Chapter 7, pp. 193-198.

* cited by examiner

*Primary Examiner*—Phung T. Nguyen
(74) *Attorney, Agent, or Firm*—Thorpe, North & Western

(57) ABSTRACT

A method and apparatus is invented that provides unambiguously detection of the charge and proximity to an object. The method and apparatus are passive and function by using the background electric fields from electrical power wiring and equipment. The invention is useful for detecting plastic and other charged objects concealed by nonconductive covering materials. Applications of this lead to plastic detectors to scan people and cargo for dangerous dielectric items similar to metal detectors. It is also useful to warn of hazards due to static electricity buildup on objects or individuals. The technology also offers touchless control capability of computers, apparatus, and games, with plastic objects such as pointers, styluses, swords, sticks, and wands. The sensors are able to detect motion while discerning between proximity to bodies with dielectric or plastic objects. It is also useful for providing people, robots, and machines with obstacle avoidance, and vision capabilities. Medial imaging possibilities also exist with the technology of this invention.

28 Claims, 11 Drawing Sheets

METHOD AND APPARATUS FOR DETECTING CHARGE AND PROXIMITY

CROSS REFERENCE TO RELATED APPLICATIONS

This application Ser. No. 10/978,142 is a CIP of application Ser. No. 10/772,908, filed on Feb. 5, 2004, now U.S. Pat. No. 7,078,911 which claims benefit of 60/445,548 Feb. 6, 2003 and claims benefit of 60/515,844 Oct. 30, 2003.

STATEMENT OF FEDERALLY SPONSORED RESEARCH OR DEVELOPMENT

Not applicable

REFERENCE SEQUENCE LISTING OR COMPUTER PROGRAM

Sequence listing is not applicable. A computer program listing using MATLAB programming language is provided to demonstrate a signal processing method using automatic gain control and detection algorithm.

Enclosed Matlab script: AGC_and Detection_Code.txt

FIELD OF THE INVENTION

This invention relates to an apparatus and method for detecting presence of charge and proximity of an object. The invention extends the electric field sensor technology disclosed in Ser. No. 10/772,908 to charge detection. The invention relates to several fields such as computing and controls, security screen, vision and collision avoidance for man and machines, electrostatic safety warning devices, and medical imaging.

BACKGROUND OF THE INVENTION

A simple method for scanning individuals for concealed metal objects exists by using metal detectors. A simple device does not exist for detecting concealed nonmetallic objects. Nonmetallic or dielectric objects can be uses in dangerous or threatening ways, or contain dangerous or harmful materials such as explosives. Thus there is a need to detect these objects.

Recently, the U.S. Department of Transportation Safety evaluated backscattered X-ray technology for this purpose. Although effective at imaging objects concealed under the clothing, it still uses potentially harmful X-rays, and the machines are expensive and bulky.

What is needed is a simple scanner for detecting dielectric objects that operates like a hand-held metal detector or the walk-through panel that warn security officers when concealed plastics are probable.

Over the last few years, a growing number of accidents occurred during the fueling of automobiles. Devastating fires or explosions occurred due to static electricity buildup on the individuals that pumped the fuel. At the instant of touching the fuel pump, a spark from the static electricity ignited the fumes and consequently the fuel being pumped. These accidents may have been avoided if a static electricity build up warning device existed. For example, a warning device might be mounted on the pump console or pump handle that indicates if static buildup on the approaching individual is detected. The warning would direct the individual to discharge the static electricity on the car chassis or other safe location before even touching the pump. Thus, a need exists for a warning device that monitors the electrostatic charge on an individual while in proximity to an explosive environment such as a gasoline-fueling pump.

The invention has application of a warning device in electronic assembly areas. Electrostatic fields can destroy electronic components. During assembly, a person may use electrostatic discharge equipment to keep their body at ground potential. The equipment may include shoe and wrist grounding straps. Even with this equipment, if a person picks up a charged object like a piece of plastic, damage to sensitive parts can occur. In this situation, it would be useful to have a warning device.

To address the warning device requirements above, a need exists for a special proximity sensor. It must detect both the presence of an individual and determining whether their body is has static charge. Existing technology does not address both of these measurements simultaneously, because static charge occurs in nature in many locations giving false alarms. This phenomenon creates significant noise to a sensor that detects only charge. For example, if someone at another location shuffles their feet, the movement of static charge between their body and the floor causes noisy signals to appear in a charge detector. The problem is these noisy signals are not distinguishable from the charge on a person closest to the sensor. Thus a single sensor capable of detection only charge is said to have charge-proximity ambiguity.

So what is needed is a method and apparatus for uniquely detecting proximity to a charged object. Additionally, the proximity sensor must be capable of detecting dielectric and charged objects such as plastics concealed by various covering materials.

Computers and games a commonly controlled by plastic stylus or swords, or sticks. The motion or commands are detected by radar, light beams, video cameras or touch controlled screens. What is desired is to simply discern motions of a hand holding a plastic object from a bare hand, or one holding a conductor. The detection of motion of a bare hand or conductor is described in the Motional Command System of U.S. patent application Ser. No. 10/772,908. The addition of the ability to detect plastic or dielectric objects a user's hand offers interesting possibilities for toys, robots, and artificial sensory technologies. To do this what is needed is a sensor to detect a nonconducting dielectric material such as plastic material via charge and proximity measurements.

Medical and imaging technology continually strives to arrive at low cost non-invasive images for diagnostic uses. A sensor with the ability to monitor charge density and proximity within objects offers possibilities for imaging.

OBJECTS OF INVENTION

An objective of this invention is to provide a method and apparatus for detecting charge and proximity of an object.

An objective of this invention is to provide a method and apparatus for detecting charge and proximity using one E-field sensor and a single measurement type.

An objective of this invention is to provide a method and apparatus for detecting charge and proximity of objects concealed by common nonmetallic materials.

An objective of this invention is to provide a method and apparatus for detecting dielectric materials such as plastic concealed by common nonmetallic covering materials.

Another objective of this invention is to provide a method for and apparatus capable of warning of hazards due to static charge buildup on objects and individual. Or conversely, detecting when a person or object is not charged.

Another object of this invention is to provide a touchless control of computers, electronic devices, and apparatus by detecting the proximity of the hand of an individual holding a piece of plastic to the sensor.

Approach

The invention achieves these objectives by disclosing an apparatus and method of detecting charge and proximity with a single sensor and single type of measurement. It does so by using the Motional Command Sensor of patent application Ser. No. 10/772,908 with a new signal recognition algorithm disclosed herein. Further claims are made on additional hardware and methods not disclosed and claimed in Ser. No. 10/772,908.

Using the algorithm with appropriate signal conditioning, the sensor is now capable of detecting proximity to charged objects concealed by common nonmetallic covering. Plastics are commonly referred herein as charged objects. As insulators, they release their charge so slowly there is usually some residual charge. They are easily charged by frictional exchange of charge, called triboelectric effect. Other materials also hold charge. Also conductors raised to some electric potential also possess charge. Molecules in material when strained also exhibit local charges over the volume. Any of these types of charge are applicable to this invention. Plastic and dielectric are used interchangeably. Plastic in this document is used as a generic chargeable material made of dielectric. Most plastics are easily charged by friction from air.

Simply placing a conducting path to ground discharges charged conductors. Insulators are more difficult to discharge but are done with a neutrally balance ionic air, or ionized air molecules from a flame.

The signal processing method disclosed here uses the properties of the E-field signal occurring when a grounded person holding a charged object approaches the sensor. The electric field of the grounded body dominates when the sensor is far from the object. The response of the sensor is to detect a voltage approaching ground. As the object approaches the sensor the electric field from object appears. The passing of the object initiates an impulse response of the sensor that shows a transient DC shift.

The charging and discharging of objects happens in various ways due to friction, induction, or conduction. Clearly, charging or discharging an object under investigated will help in recognizing signals. Sometimes shielding occurs between layered charged objects, and a method of discharging is useful. For example clothing can carry charge and shield an objects E-field. By blowing ionized air over the person, the clothing first becomes discharged. Thus there is no charge on the clothing and the fields are visible to the sensor from concealed plastic objects.

Alternatively, we may induce a charge on objects to improve contrast. This can be achieved by an external electrostatic fields generated by intentionally charged elements in proximity to the object or person being scanned. The charging of the elements may be mechanically charged by friction or high voltage sources.

In the scanning method, the person is grounded standing or walking on a conducting matt and holding onto grounded guide rails. The sensors scan over the body, either manually or as the person walks through the scanners. The scanners include a plurality of sensors. The sensors are mounted around a frame resembling a walk-thru metal detector. Upon recognizing the plastic signal an alarm sounds.

Hence, we have now described a sensor system in a wand or walk-thru panel capable of detecting plastics and charged objects in a similar fashion as metal detectors.

The same disclosed sensor and processing is also used for an explosion or flammable warning sensor system. As the person approaches the sensor, the processor recognizes the proximity and charge signals. If a static charge is detected a warning signal is issued. The sensor is located proximate to the area with the ignition sensitive vapor. Locations are to be to the peripheral of the hazard zone. Reasonable sensor locations are on the pump or hose handle of the gasoline fuel pump.

Sensing Method Review from Ser. No. 10/772,908

The disclosed E-field sensor circuit in Ser. No. 10/772,908 is also used in this invention. This invention actually is a disclosure of signal processing techniques. The operation and advantage of the sensor are now reviewed for convenience to the reader.

The sensor operates passively. It detects an object in proximity to the sensor by observing disturbances in the electromagnetic energy background. In particular, it detects disturbances in the electric field produced from electrical power wiring. The signals are not total static, but do oscillate between 50–60 Hz throughout the world. These frequencies are in the audio band and their behavior is adequately approximated using static electric field theory. Such signals are described as E-fields.

The sensor has the advantages of using the electric fields from electrical power wiring as a probe. One advantage of this new method is considerable signal power exists in the background making for strong signal detection at large standoff distances. Another useful feature is the audio frequency E-fields penetrate deeply into a variety of dielectrics including wood, brick, soil, water in the waterways and the ocean.

A significant key feature of the sensing method is it operates passively, i.e., it transmits no energy. The passiveness of the invented method offers safety and covertness during scanning. This is because no energy is transmitted; hence there is less possibility for a device to detect its operation. This means it is also less likelihood to cause a bomb to detonate during scanning.

Key Features of Invention

A key capability of the invention is to detect proximity to electrically charged and uncharged objects that are concealed by common non-metallic covering materials.

Another key feature of the invention is to detect discernibly between proximity to charged and uncharged objects when concealed on body or in the hand of a person.

Yet another key feature of the invention is to detect variation in the electrical properties of an object to create an internal image.

E-Field Sensor Technology Review

Several E-field proximity sensors have been reported, but none operate passively. Neither do they examine disturbances in the AC 50–60 Hz part of the electromagnetic spectrum. In fact, most electronic devices struggle to filter out the energy in this frequency band.

Another difference between the invented sensor technology and prior art is this invention offers unambiguous detection of charge and proximity. In particular it has the useful ability to discriminate signals coming from charge on a proximate object and a distant object by using one sensor and a single type of measurement. This feature makes it possible to uniquely associate charge with the proximate object. This feature also makes possible the detection of plastic.

All E-field sensors use some type of high input impedance amplifier either in discrete component form such as a FET transistor or in the integrated circuit form of an operational amplifier. One input to the amplifier is an antenna where the charge is pushed into the amplifier by the E-field. This causes a potential difference across the high input impedance of the amplifier input relative to a reference potential such as earth ground. New features of the invented sensor are the method of maintaining high input impedance throughout multiple stages of amplification, the method of filtering, and the method of detecting the AC 50–60 Hz signals for processing. These details are disclosed in the Detailed Description of the Invention of this application.

Varieties of E-field sensor circuits have been reported openly in literature. Beaty discloses in open literature, a discrete FET circuit and an operational amplifier circuit to detect signals produced by static electric charge. The amplifier produces a signal with strength indicative of proximity to static charge only. Ambiguity exists because sensor has no ability to associate charge with a proximate object. Additionally, the circuits do not allow for proximity sensing of non-charged objects.

An active E-field sensor method has been reported by the MIT group of Professor Neil Gershenfeld and Joshua R. Smith in U.S. Pat. No. 6,051,981. In our applications, several disadvantages exist for using the MIT E-field proximity sensor. One is it is uses an active method requiring a transmitter with inherently low efficiency at low frequencies. This also means the transmission can be detected by a bomb and cause its detonation, and second the low power output due to small transmitting antenna limits the sensor range and penetration depth through covering materials. Thus the usefulness is reduced in detecting concealed materials actively may raise safety concerns. Also Gershenfeld makes no disclosure or claim of detecting concealed objects.

Both Beaty and Gershenfeld E-field proximity sensors lack the ability to use one sensor and a single measurement to independently resolve proximity and discern the presence of charge in a single measurement. Thus both methods exhibit charge and proximity ambiguity. The Beaty method detects proximity to charge only, and fails to detect non-charged objects. The Gershenfeld method requires more than one sensor and multiple types of measurements during transmission and reception. The Gershenfeld method is not passive and involves multiple transmit and receive measurement.

Other capacitive type proximity sensors using AC frequency shifts due to changes in oscillator capacitance have been recognizes around the time of the advent of radio circuits. These methods are not passive in they require some radio transmitter, and also lack in range of detection. They also lack the ability to sense charge on an object.

Other proximity sensors used frequently like infrared, and ultrasonic. A common problem in using these sensors is they do not detect charge, they are directional, and they do not penetrate materials well. Also inanimate objects at elevated temperature, and ambient temperature fluctuations can spoof infrared sensors. Thus infrared sensors are not ideal for object avoidance or machine vision. Ultrasonic or acoustic proximity sensors require a good acoustic reflection to detect a good target echo. Good acoustic echoes also do not exist for when reflected from acoustic absorbing material. Hence, it is probable that the ultrasonic sensors on vehicles intended for object avoidance may not detect a child in a soft winter coat on a rainy day. Additionally, there is no sensor as claimed in this invention that recognizes proximity control codes, such as two quick approaches by the hand, to avoid unintentional triggering by people or objects passing by or other noise signals in the background.

Out of all of these reviewed proximity sensors above, none detect the presence of charge and proximity unambiguously. This inventors U.S. patent application Ser. No. 10/772,908 for a Motional Command Systems, a sensor was disclosed similar to the one in this application. That sensor called Motional Command Sensor but it did not claim use of the charge and proximity signature.

The reason the prior art fails to resolve proximity and charge independently is because two independent measurements are necessary to detect two unknowns, charge quantity and distance from the charged object. Thus there is a charge-proximity ambiguity with these sensing methods. For static charge the E-field strength is proportional to charge quantity and inversely proportional to the square of distance. For the active source radiating in a dipole mode, the E-field strength is proportional to charge quantity and inversely proportional to the cube of the distance. In either case, false alarms occur because an equivalent E-field strength can occur from any distance if the charge quantity is adjusted according, or visa versa. Hence, the detection process is not unique and the prior art sensors are subject to interference from background noise such as lighting, and other static buildup or discharge within and outside of the interested sensing range. Thus the sensors suffer from charge-proximity ambiguity.

So what is needed to implement the invention is a passive proximity E-field sensor that has large range of detection, deep material penetration capability, and is capable of resolving unambiguously charge and proximity with a single kind of measurement. This need is addressed herein by this invention.

Aspects of Invention

It is an aspect of the invention to provide a method and apparatus for detecting the proximity of an object or individual.

It is an aspect of the invention to provide a method and apparatus to detect charge and proximity of a concealed object.

It is an aspect of the invention to provide a method and apparatus to detect plastics concealed on individuals or by some nonmetallic covering material.

It is an aspect of the invention to associate an E-field signature produced from plastics by using the plastic sensor apparatus and method.

It is another aspect of the invention to be used in portable and walk through plastic scanners similar to existing metal detectors.

It is another aspect of this invention to be integrated into metal detector technology.

It is another aspect of this invention to detect plastic materials concealed behind or within in walls, floors, or buried in the ground.

It is another aspect of this invention to detect the proximity of an electrically charged object.

It is another aspect of this invention to estimate the magnitude of the electrical charge associated with an object.

It is another aspect of this invention to discriminating external noise fields from fields produced by screened objects.

It is another aspect of this invention to warn of an explosion hazard due to electrostatic charge buildup on individuals moving near fuel pumps or other explosive materials.

It is another aspect of this invention to populate a plurality of said sensors on a computer screen or other medium to determine location position of a plastic stylist or permanently charged stylist, or other object such as a hand or finger in two or three-dimensional space.

BRIEF DESCRIPTION OF DRAWINGS

The invention will be better understood upon reading the following Detailed Description while referencing the provided drawings.

DETAILED DESCRIPTION OF THE INVENTION

This invention detects unambiguously the proximity of objects to a sensor and the presence of electrical charge on the object. It does so by detecting proximity by detecting modification to local electric fields by the proximate object. In particular the invention uses the background fields from the 50–60 Hz A.C. power wiring. Unless in extreme remote locations in the world, the power grid through out the world provides some observable 50–60 Hz electromagnetic energy.

In urban areas in a residence or commercial building the electrical wiring supplying electricity to outlets, lighting, and appliances in rooms tend to provide the dominating electric field sources in the room. These sources and sources from afar tend to result in nearly omnidirectional local electric field strength. Also the field strength seems fairly constant or stationary in time relative to the time required to scan an object. These observations make the electric field strength approximately static over the scan time. The term E-field is used to describe electric fields having the said properties.

This invention senses the background E-field by measuring the electric potential at the location of the sensor. An antenna connected to one input of the amplifier is used to probe the E-field. The remaining amplifier input is grounded at earth potential or maintained at a specified potential. The signal is then filtered and amplified by several stages and run through a detector. The electrical signal output from the detector is further amplified and digitized by an A/D converter, and stored for signal processing. Processing is either done online in a DSP or offline in a PC. A signal is sent to a speaker or other device to warn of the detection.

An electrically conductive object is held at the electric potential of a body in contact with it. When the object is placed in the electric field, it maintains constant potential through induced surface charge. The surface charge density is proportional to the difference in the electric field outside and inside the object. This surface charge modifies the local electric field around the object to have the same electric potential as the object. The charge is drawn from the source providing the constant potential. This is either a voltage source or the earth ground.

The disclosed sensor measures a decreasing background potential as the sensor approaches a conducting object held at earth ground potential. The same occurs if the object approaches the sensor.

Figure 1:
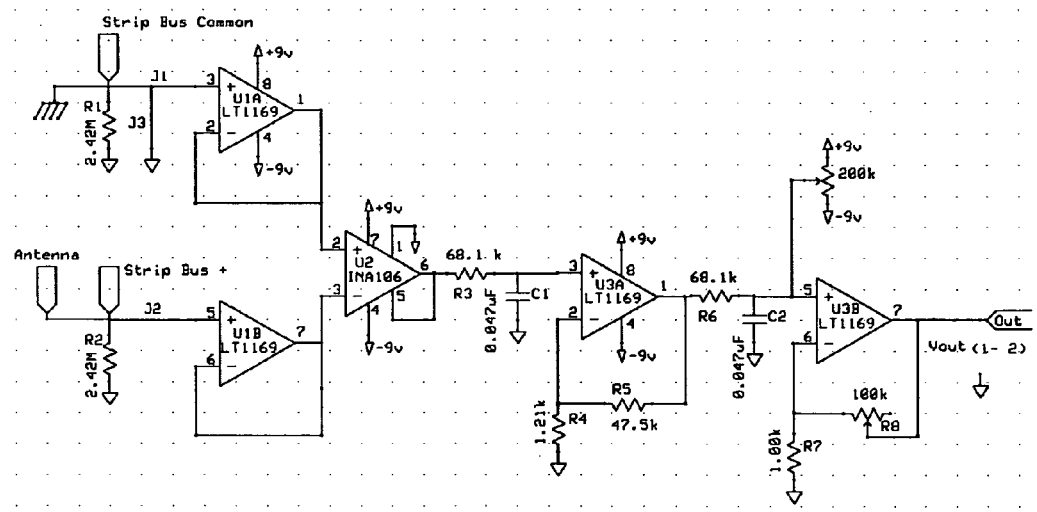
FIG. 1 shows a schematic of the proximity and charge sensor preamplifier.

A schematic of the sensor is shown in FIG. 1. The sensor input consists of two high impedance, low noise, buffer amplifiers that run into a differential amplifier followed by two subsequent stages of low noise amplification and filtering. It offers high gain and passive filtering that passes signals below 60 Hz. It also offers exceptionally high input impedance at each stage of amplification by using non-inverting amplifiers. The amplifier operates in common-mode to specifically detect the background noise. Common-mode operation is obtained by grounding one input while placing a 4-inch antenna wire on the other input.

The sensor circuit is designed using the common-mode feature is something not intentional done for high performance E-field sensor technology. In fact, it is the exact opposite design of what is typically and instinctively done by amplifier designers. This is because prior E-field sensors are not looking for line noise but design to remove it. The disclosed design operates the amplifier in common-mode, uses high input impedance amplifiers with low noise, and uses specific filtering to pass the line frequency signals. This sensor also has a bandpass between DC and 60 Hz to detect static fields due to static charge. Hence, the sensor functions as proximity detector by the phenomenon describe below, and a static charge detector. The static charge is detected by observing a DC component on the background line signal.

The background signals are so much larger than typical signals being detected that the filtering and amplification requires equalization by rolling off the low pass filters below the line frequency. Also the signal indicative of proximity is the change in the background signal with time. This change is of the order of 1/1000 V of out of background of order of 1 V. Thus the signal to noise ratio (SNR) is really −60 dB. This small SNR requires sensor with large amplification and precise voltage resolution and careful detection circuitry. The overall typical amplification of the sensor and detector system is approximately 5 million times neglecting attenuation due to filtering. This large amplification requires the use of low noise amplifiers to avoid saturation, and DC offset adjustment circuits.

Figure 2:
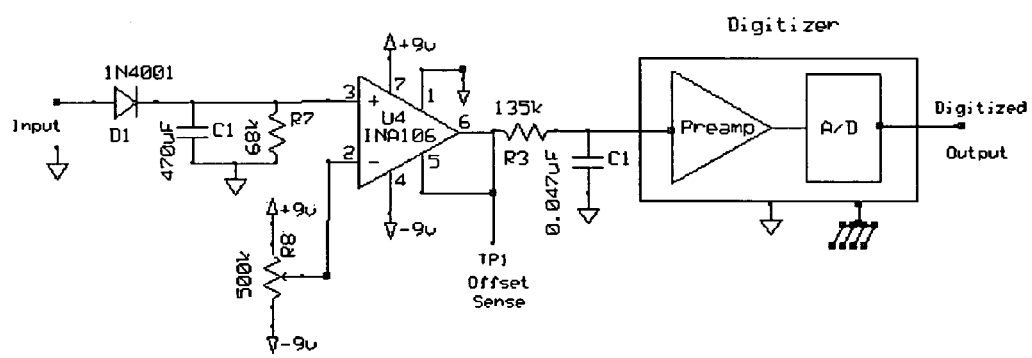
FIG. 2 shows a schematic of the proximity charge sensor detector circuitry.
Figure 7:
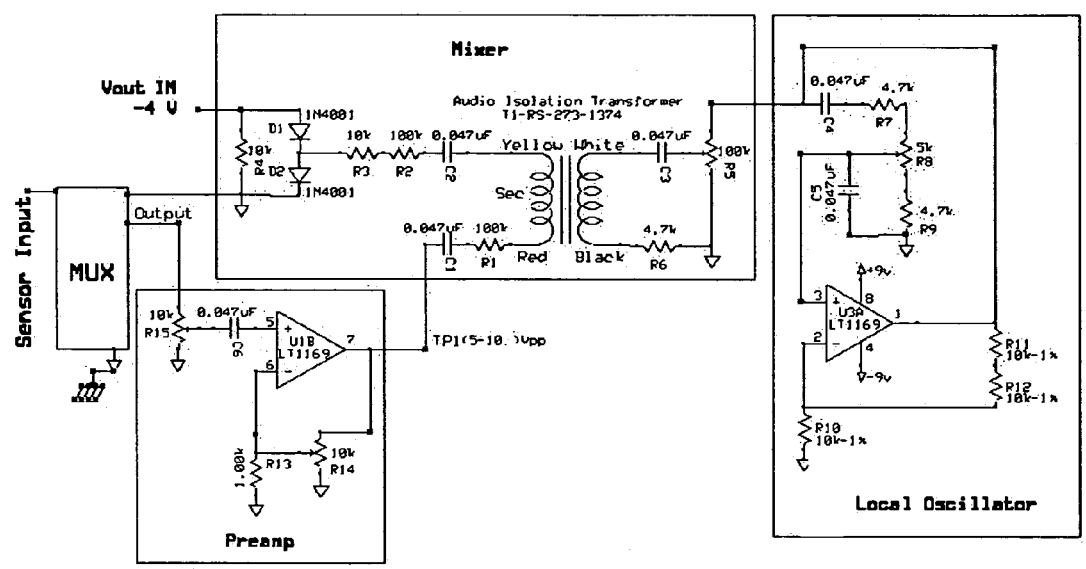
FIG. 7 shows a mixer circuit for increasing the output frequency of the proximity signal from the line frequency to about 200 Hz–300 Hz.

The signal output from the sensor preamplifier shown in FIG. 1 can be digitized directly and processed or input to a detector or modulator circuit. A detector circuit useful for observing hand motion and body motion is shown in FIG. 2. It is DC coupled and therefore also responds to the signal from static charge. A frequency modulator circuit is shown in FIG. 7. It up-converts the output of FIG. 1 from the AC line frequency to a more audible frequency between 200 Hz and 300 Hz. The modulator facilitates digitization and processing on a PC sound card. One that is familiar with the art will recognize other modulation and detection techniques are available, and all are claimed in this application.

The detector shown in FIG. 2 provides envelope detection with a diode detector commonly used in AM radio. The detection circuit time constant is adjusted to be fast enough to observe the motion being sensed and slow enough to provide a smooth signal. The time to detecting a waving hand or pass a plastic scanner over an object is about 0.2–3 seconds. The parallel RC circuit with the indicated values of C1 and R7 works well. The differential amplifier provides the required DC offset correction to prevent saturation of the INA106 and digitizer. The gain of the INA106 is 10 or 20 dB. The last stage of the detector uses a low pass filter with a corner frequency of about 12 Hz to clean up the signal. This corner frequency is chosen to also help equalize passes signals corresponding to frequencies of relative motion between the object and sensor.

The output from the detector is signal conditioned with additional amplification and DC offset adjustments prior to digitization. The digitization hardware is not new or unique to this invention and can be done using a digital oscilloscope or other commercial hardware such as A/D cards or even custom made circuitry. The inventor used a digital oscilloscope to capture the signals from scans.

The proximity signal is observed by noting the change in background voltage amplitude due to the presence of the object within the scanning range of the sensor. In cases where gains of 10 or more are applied prior to digitization the DC offset needs nulled or the input to the A/D or its preamplifiers will saturate. The inventor has used the sensor with preamplifier gains up to 1000 after careful manual nulling of the background signal for high sensitivity scanning.

Figure 3:
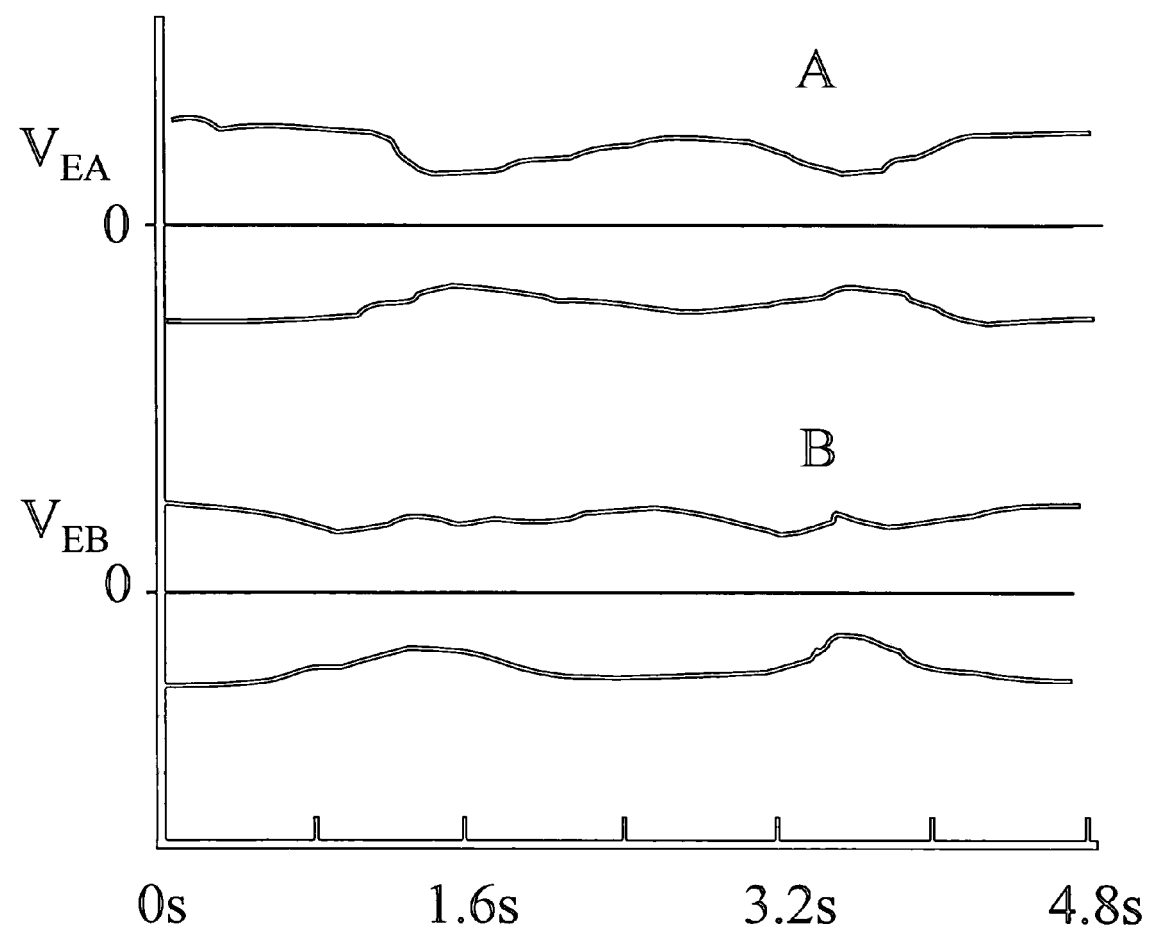
FIG. 3 shows an oscilloscope trace of the AC waveform envelope as output from circuit shown in FIG. 1 for hand approaching sensor twice as a pulse. Waveform A is for a bare hand. Waveform B is for a hand holding a plastic fork. In both cases, the inactive hand was grounded to earth.
Figure 4:
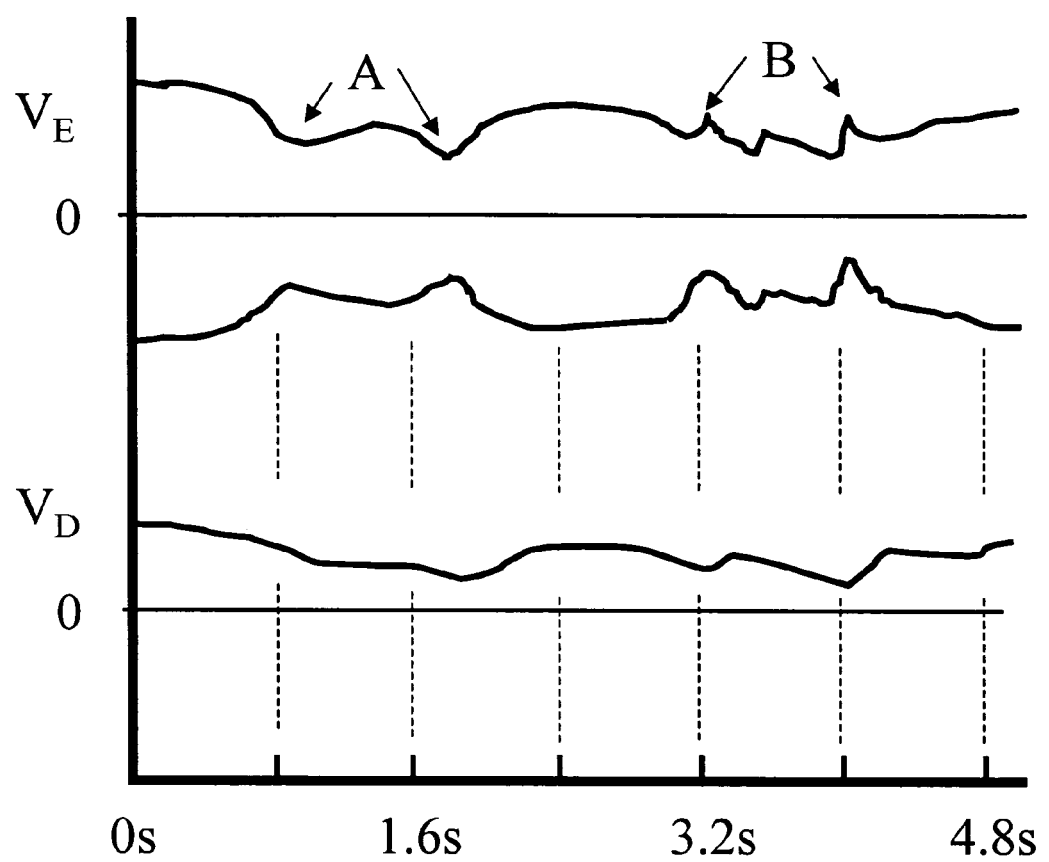
FIG. 4 shows the AC envelope voltages $V_E$ and detector circuit output voltage $V_D$ for handpulse.

FIG. 3 and FIG. 4 show scans of a person's bare hand compared with scans when the person is holding a plastic object. The plastic object in FIG. 3 is a plastic pair of safety glasses. The plastic in FIG. 4 is a plastic fork partially concealed in the hand.

FIG. 3 shows the resulting voltage envelope traces appearing on an oscilloscope. Trace A shows the voltage $V_{EA}$ corresponding to two passes without plastic. Trace $V_{EB}$ corresponds to two passes with plastic.

FIG. 4 show both the envelope voltage $V_E$, and the corresponding detector voltage $V_D$. In FIG. 4 first a bare hand is scanned with a double pass over from time 0s to 2.4s. This time of closed approach is indicated by label A. Later in time, two more passes occur; but now a plastic fork was picked up. Label B indicate the time and feature when the plastic passed nearest to the sensor.

The signal envelopes in FIG. 3 and FIG. 4 are from the output of the sensor preamplifier outputs shown in FIG. 1. The envelopes are modulated at a carrier frequency of the mains of about 60 Hz. The scans are captured on a digital oscilloscope. In all cases the person is grounded to earth through the ground wire in the electrical wiring connected to the opposite hand that the plastic object is held in.

The results shown both FIG. 3 and FIG. 4 indicate a decrease in the 60 Hz AC signal amplitude as his hand approaches the sensor, accompanied by a sudden DC offset when plastic approaches the sensor. By noting the simultaneous occurrence of both these features, we recognize that the polarization or residual charge is detected. The sudden DC offset occurring from plastic has a duration of approximately 0.2 or less. In all cases the plastic was in contact with a grounded first by a ground wire and then placed in the hand of the person that is grounded.

The detector Voltage $V_D$ shown in FIG. 4 is an analog representation of the envelope amplitude. It is useful when simplified and low cost electronic detection is required. The signal may further be processed by digital or analog means. Either method of processing will results in some type of threshold level detection.

The detector signal also shows the sudden DC offset due to the plastic appearing in the envelope signal at approximately 3.2 sec and 4.0 sec. The signal lags some in time from the A.C. envelope peaks shown in B. This occurs because the signal level is the result of an averaging process over the time constant of the detector circuit.

These plastic signal characteristics described above and illustrated in FIG. 3 and FIG. 4 allow for the discriminating of screened object signals from external noise fields. This is so because the detection algorithm looks for a decrease in amplitude and a sudden DC offset. Random noise due to stray charge only produces a sudden DC offset.

The process of detecting proximity to charged objects works similarly as detecting plastic except the DC offset is not necessarily transient, and increases with decreasing separation between the sensor and the charged object. The DC offset increases as the charged object approaches the sensor. Again however, the AC signal is also shown found to decease with proximity.

The process of detecting proximity is the same as above but no DC offset is associated with the decreased amplitude of the AC signal.

Figure 5:
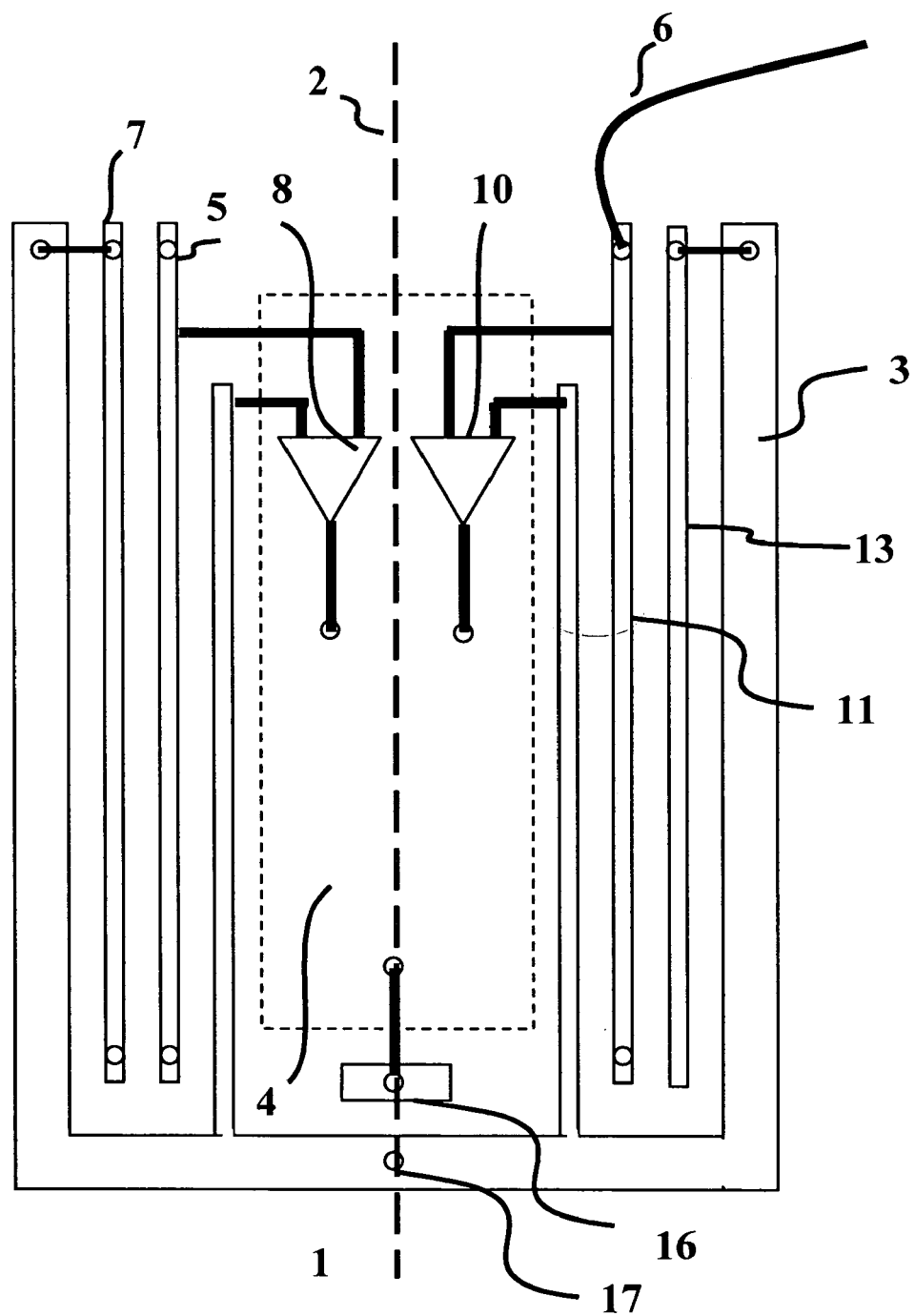
FIG. 5 illustrates the sensor pad made by balancing the input capacitance to the amplifier circuitry on a printed circuit board.

FIG. 5 illustrates a printed circuit board layout that is designed to assure a balanced of capacitance the input circuits of the amplifiers. An important ingredient to the sensor preamplifier shown in FIG. 1 is the circuit layout. The PCB is layout reasonably symmetrical with respect to line 2, except for the antenna wire shown as item 6. The high input impedance circuit sensor strips 5, and 11, are approximately equally surround by ground strips 7, and 13. The capacitance due to the circuit board is balanced at the input of the amplifiers 8 and 10. Jumpers between 7 and 13 to boarder ground trace 3, or to 5 and 6 respectively are used to vary the sensitivity. They effectively alter the input capacitance or can increase the antenna length on the PCB. These traces make the sensor pad that is scanned over the object. The output is taken from the pad at 16 and the ground strip at 17 by a coax RG-174 not shown. A Pyrex glass insulator, placed over the pad helps in preventing charge leakage from the sensor to its surrounding and thus is useful for preserving sensitivity.

Other insolating materials over the face of the pad have worked, but Pyrex glass insulator is found to give superior detection sensitivity, particularly when placed on a wooded surface. Both the in-air sensitivity and through throughwood sensitive is superior in this case. It is such that the dielectric constants are matched well between the sensor covering insulator and the concealing covering material. Thus it is claimed that a sensor cover with a dielectric constant of that near Pyrex of 4.0 is claimed. Also claimed is a sensor insulator that matches the dielectric constant of the concealing media matching dielectric constants and insulating properties similar or better than stated are claimed. Others sensor insulating materials and dielectric constant matched sets between the sensor insulator and the concealing material may be known or developed by one familiar in the art, and are also claimed in this invention.

Figure 6:
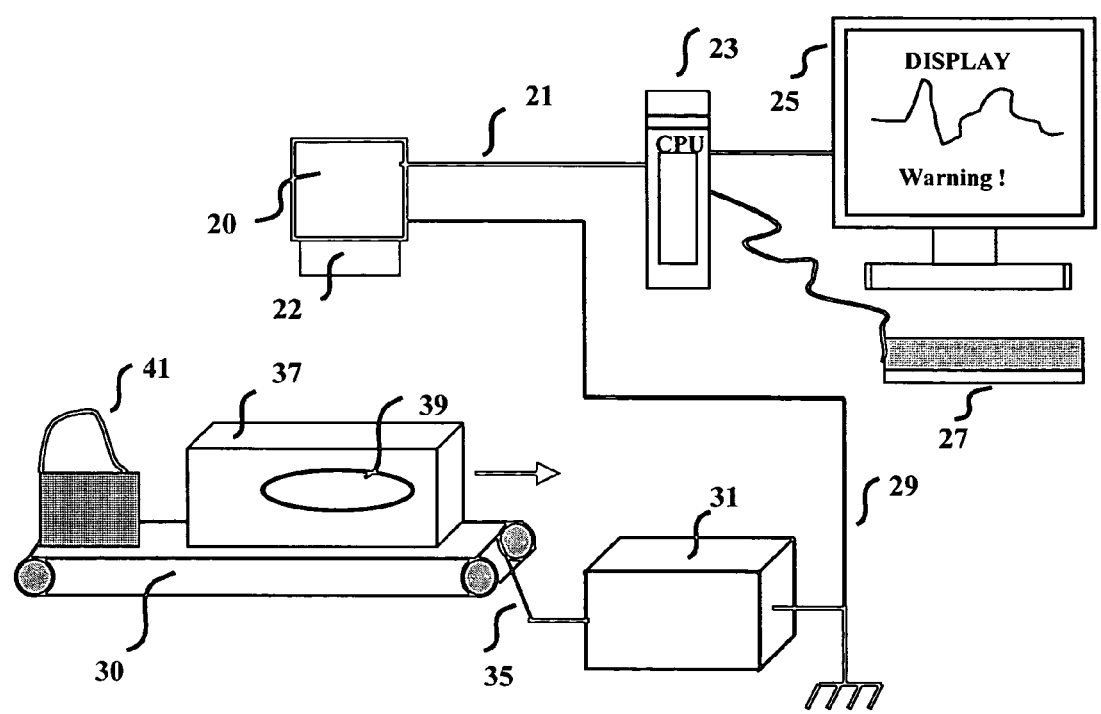
FIG. 6 shows a schematic of an apparatus and method for scanning objects for concealed plastic objects.

FIG. 6 shows a schematic of an apparatus and method for scanning objects for concealed plastic objects. The objects could also in the hand or concealed on the body of the individual. Items 37 and 41 are objects where 37 is a purse and 41 is a wooden box containing a plastic or charged object item 39. Also sensor 20 could be a hand held sensor that is moved to and fro just above the scanned object, or the objects may move such as in this figure. Item 22 is the glass insulator material over the face of the sensor 20. Sensor 20 can be housed in a metal material or glass insulator similar quality insulator. Sensor 20 may include a detector and a digitizer with appropriate signal conditioning, or these items may be contained in the CPU unit shown in item 23. Cabling 21 connect the sensor and the CPU. Item 25 is a display unit that gives warning of detection based on said algorithm computed on the CPU. Item 27 is an input control such as mouse and keyboard for the system. Item 31 is an optional potential modulator for increasing signal to background noise level. It switches the potential from ground line item 29 to a defined value applied to the object. The modulator connects in this illustration to a conductive conveyor belt shown in item 30. Item 31 can increase the sensitivity of the method by adding potential or E-field contrast between the object and background. It raises the potential of the object being scanned at some interval with a coded signal. The scan is then timed so the sensor analyses sections of the signal having the code.

FIG. 7—Shows a circuit for increasing the output frequency of the proximity signal from the line frequency to about 200 Hz–300 Hz. The local oscillator is a Wien Bridge and the frequency is set by the value of its passive components. R8 is adjusted till the circuit drives a clean sinusoid into the primary of Radio Shack audio transformer. The secondary of the transmitter then superposes the sinusoid voltage of the input at the line frequency with the sinusoid voltage at the frequency of the local oscillator. This signal current is then mixed quadratically through the diode mixer and the output is either filtered with analog circuitry or digitized and filtered digitally. The output is a sinusoid signal at either the local oscillator frequency plus or minus the line frequency detected by the MCS. The amplitude of this higher frequency sinusoid is modulated according to the proximity of the object to the sensor as before. The method of detection shown in FIG. 2 is also useable with the output of the frequency up converter; but the time constant of the RC filter in the input is reduced to allow for faster envelope detector time response. Since the diode detector circuit shown in this figure is a half wave rectifier, half of the mixed signal is output. In this case, the negative half appears. One skilled in the art can increase the mixed signal output by using a full wave diode detector, and or change the frequency of the signal output.

There are several advantages to increasing the frequency of the proximity sensor signal. The increased frequency allows the proximity signals to have more audible frequency components suitable for play into a loudspeaker, or digitized into an AC coupled A/D or soundcard. The increased frequency also increases the sensitivity and fidelity of the proximity signal when digitized, processed, and played through a sound card or AC coupled A/D. Also increasing the AC frequency output allows for more spatial resolution of an object's motion. This happens because at the higher frequency there are more sinusoids per second to estimate the amplitude of the proximity signal. From a digital processing prospective, more sinusoids are obtained per second that yield more amplitude estimates per second of the track sensor input.

The multiplexer at the input optionally allows for more sensor inputs. The preamp circuit is also optional and is used to buffer the MUX output. The preamp may also appear before the MUX in plurality so the sensor signals from each channel can be buffered and the signals into the mixer are buffered and balanced. The gain of the preamp is adjustable by varying R14.

Figure 8:
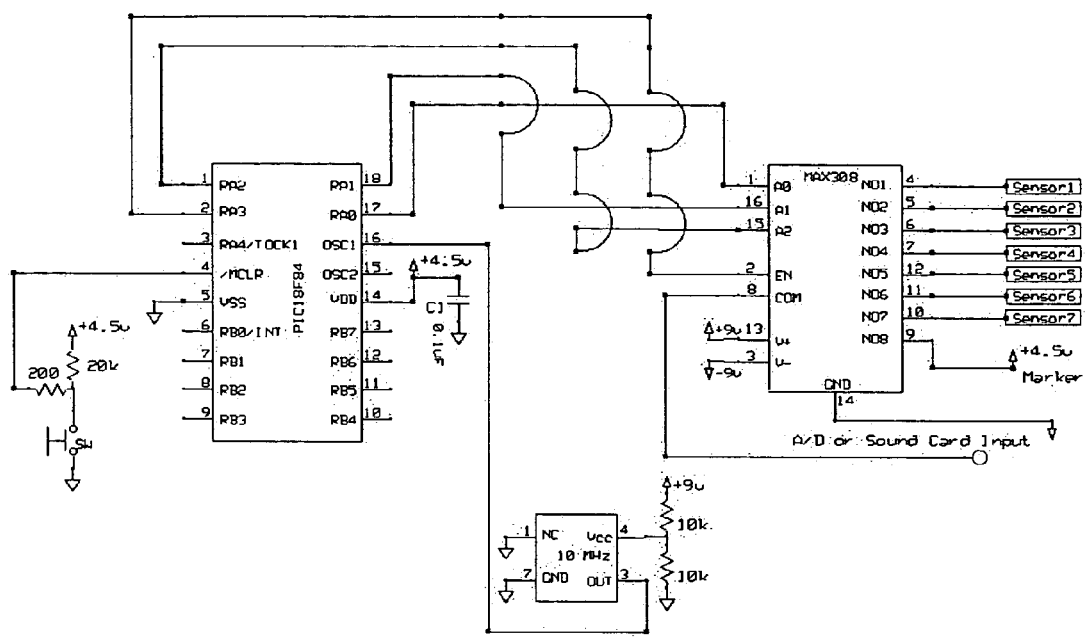
FIG. 8 shows an implementation of the multiplexer (MUX) for the proximity-charge sensor.

FIG. 8 shows an implementation of the multiplexer (MUX) used for collecting data from a plurality of proximity-charge sensors. The PIC chip is a microcontroller that is programmed to send a three bit binary count to the MUX chip, the MAX300. The signals input to pins 4 through 9 are switched at the count rate to the common line on pin 8. The microcontroller switching is setup in the program to a frequency that results in the sensor signals each being sampled for 5–10 stable data points by the A/D or sound card.

Figure 9:
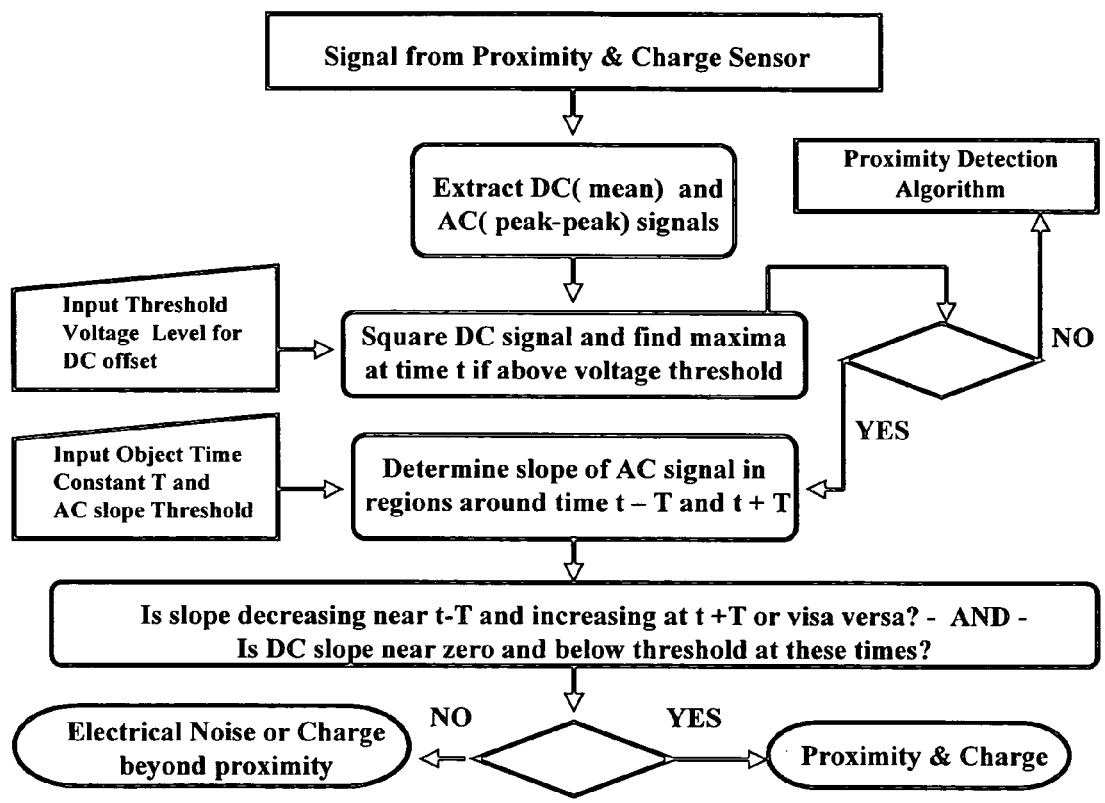
FIG. 9 shows the digital processing algorithm flow chart for detecting proximity and charge. If charge is not detected then the process flows to the proximity detection algorithm shown in FIG. 10.
Figure 10:
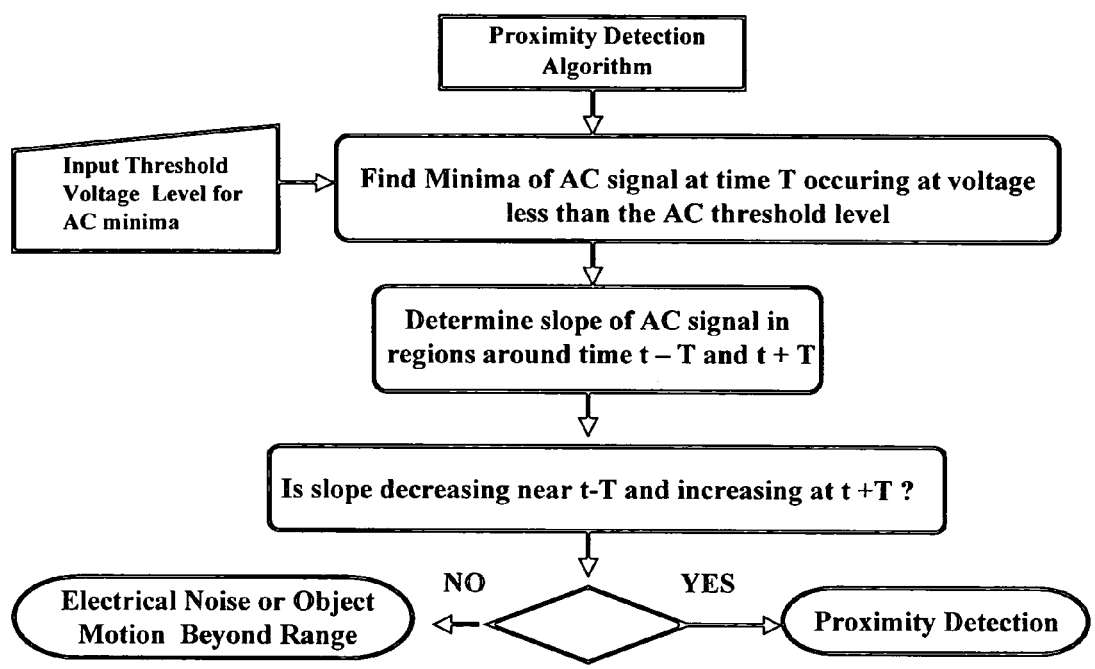
FIG. 10 shows the digital processing algorithm flow chart for detecting proximity. This detection algorithm is covered as a digital means of proximity detection with E-field sensors as in patent application Ser. No. 10/772,908.

The said method of detection of charge and proximity using the invention is illustrated and easily implemented through digital signal processing. FIG. 9 shows the digital processing algorithm flow chart for detecting proximity and charge from the preamplifier output of FIG. 1. If charge is not detected then the process flows to the proximity detection algorithm shown in FIG. 10. The implementation of the said proximity-charge detection algorithm may also be performed in electronic circuitry and may have advantages in small low cost charge-proximity sensors.

The said detection processes apply also for objects or bodies concealed by common nonmetallic construction materials. A plastic concealing material seems to shield a plastic object sensed by one sensor but in cases sensor arrays seem to show contrast in signals indicative of the local material volume and electrical properties. On the other hand, an approaching body seems to induce charge into the plastic covering and results in detection when the proximity signal is also detected. An array of sensor is required to get finer special resolution. The array is either moved closer to the object, or the object moved to the sensor, or scanned horizontally and the proximity signal contrast and charge is monitored with position. It is also claimed that using an array of said sensor imaging of an object using the charge-proximity sensor is possible when the object is placed on plastic or plastic is placed over the object.

Figure 12:
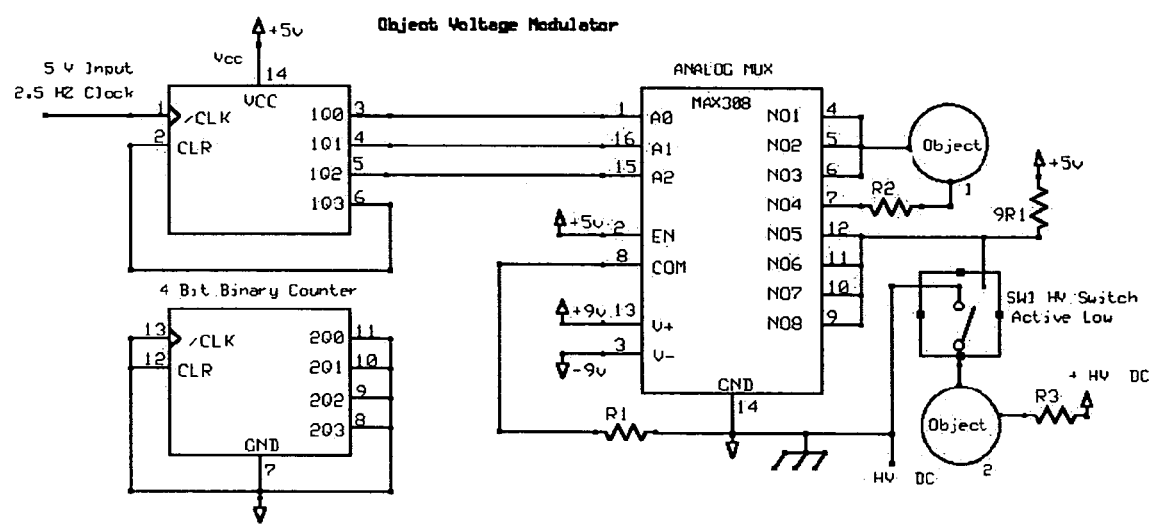
FIG. 12 illustrates circuits for electrically modulating the signal for adding contrasts.

To improve contrast, the potential modulator shown in FIG. 6 as item 31 is available. FIG. 12 shows a proven potential modulator circuit for improving scanned object signals from the proximity sensor. It helps with detection of weak signals in noisy environment by allowing for unique digital coding of the scanned line frequency signal amplitude. Once the code is detected by a digital detector, the coded time segments of the scan traces with largest signal to noise ratio are used to process the charge and proximity signals. Object 1 is a passive connection where no voltage is applied to the object. Object 2 is maintained at a high DC potential until any of the inputs of at NO5 through NO9 are switched by the MUX. At that time the digital high voltage switch is closed to ground. The minimum value of R1 is not critical and can be zero for best signal level; but providing a grounding path of low resistance if Object 1 is a person may require R1 to current limiting resistor for safety such as 0.1–1 MOhms. R2 on the other hand should be much more than R1 MOhm to provide contrast in signal levels. The maximum R1 and the combination of R1+R2 should be less than the isolation impedance magnitude of the object to ground at the line frequency. Object 1 is switched at near earth ground potential for either pins NO1, NO2, or NO3 switched closed to the common pin COM. Object 1 is held a higher potential magnitude when pin NO4 is switched closed. Object 2 is held at some high voltage with a current limiting resistor R3. The digital high voltage switch connects object 2 to near earth ground potential when either of pins NO5 through NO8 are switched closed. The figure presents configurations for illustrating switching techniques, but any code or combination thereof is claimed.

The technology disclosed in this invention has a similarity to X-ray and MRI type scanning systems for medial imaging, with the exception of the type of radiation used. It is anticipated the said scan techniques disclosed in this application are of value to the medial community the disclosed technology is claimed for use in medial imaging.

It is convenient to have an automatic gain control(AGC) ability to automatically control the DC offset, and DC AGC, and an AC AGC to maximize the AC proximity signal and keep both signals within circuitry voltage limits. This design prevents saturation of the A/D and adjusts the AC gain to compensate for variations in background due to location relative to electrical wiring and power supplies. The key to using the AGC with the success in the invention is the gain must be fixed once proximity and charge detection process begins. A common analog AGC with voltage reference is made with a logarithmic amplifier. The voltage reference is the level the signal is to be amplified to when the sensor is in ambient background noise. The AGC then is fixed to provide the constant gain by a timing circuit or trigger that begins the charge and detection process. The logarithmic amplifier is also expected to extend the range and linearity of the field of detection at extended range because the sensitivity of the sensor seems to decrease by a power law.

Another method for providing the sensor with both the AC AGC and DC offset AGC is to us a computer equipped with and analog to digital converter (A/D) and a digital to analog converter (D/A). For example, a computer might be a PC with data acquisition card, or a Digital Signal Processor chip, or microcontroller such as one from the PIC16F series. The later provides a means to make a compact smart sensor, and the PC provides a powerful larger systems. The choice depends upon the requirement of the application using the invention.

The computerized AGC process is as follows. First, the A/D is used to monitor the steady state DC offset of the background signal at the detector output. This is done by first computing a running average of A/D measurements taken after a recorded digital record is obtained. Then the D/A is activated to provide the necessary correction voltage to, pin 5 of U3B in FIG. 1, and or pin 2 of U4 in FIG. 2, to automatically achieve a workable DC offset level instead of manually adjusting the potentiometer R8.

The DC offset correction at the input of U3B is easy enough to satisfactorily null by adjusting manually and then moving away to check the null. The critical adjustment is the DC offset correction at the input to U4 and should be controlled by an AGC, especially if large signal conditioning gains are expected. Afterwards, the last recorded is examined to determine the maximum fluctuation about the mean. The necessary preamplifier gain is such that the positive and negative swing in the sensor output does not exceed the rails of the A/D after signal conditioning. The controller then applies the appropriate gain level to the signal conditioner by switching resistors in the signal conditions amplifier feedback loop.

The included Matlab script simulates the AGC control method for using a computer to adjust the gains in an automatic fashion either in the sensor preamps or in the preamp to the digitization circuits or equipment.

Figure 11:
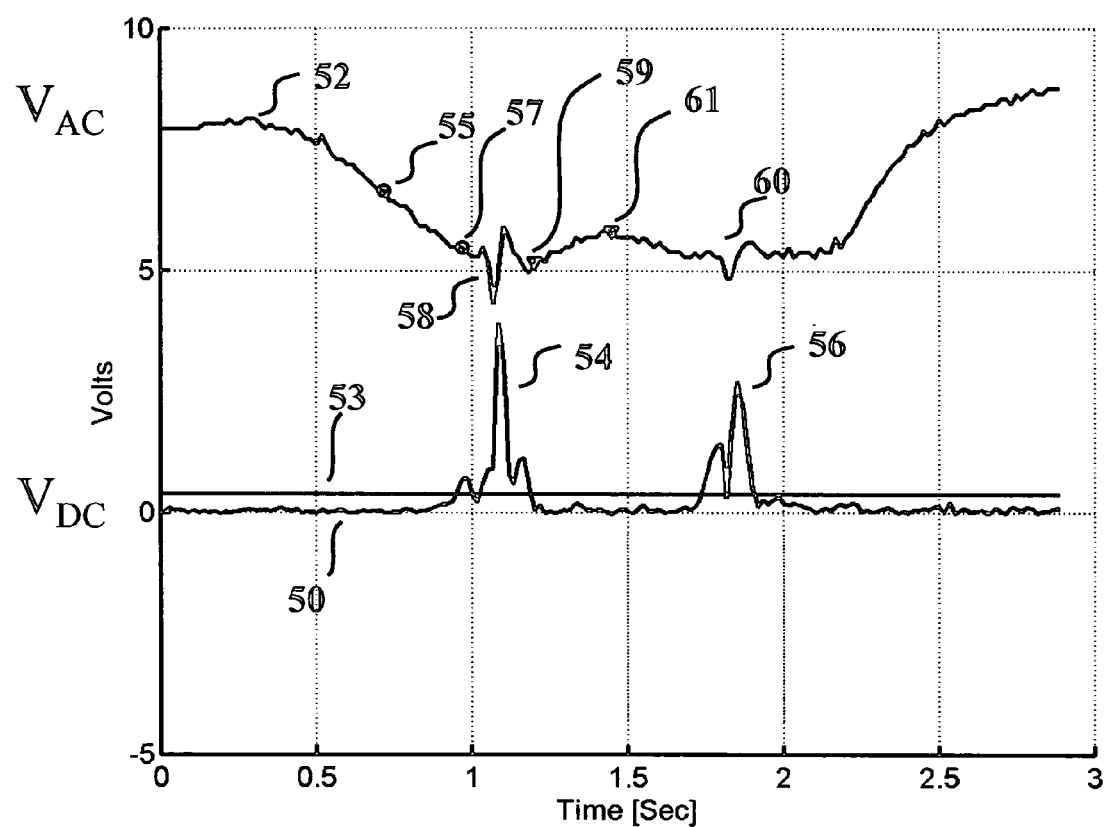
FIG. 11 shows signal Processing results when using the disclosed Charge-Proximity Algorithm of in FIG. 9 and FIG. 10.

FIG. 11 shows signal processing results using the Matlab detection code with automatic gain control, and the simulation and the implementation of the disclosed charge-proximity algorithm. The scan is a double pulls of a hand with plastic. Item 50 and Item 52 show voltage waveforms of the DC magnitude and the AC amplitude respectively. Item 53 shows the DC threshold level. DC peaks in the waveforms are shows with items 54 and 56. AC signatures due to plastic are indicated with items 58 and 60. Item 55, and Item 57 indicate the date points used for computing the slope of the AC signal on the left hand side (LHS) of DC peak item 54. Item 59, and Item 61 indicate the data points used for computing the slope of the AC signal on right hand side (RHS) of the DC peak. Charge from plastic and proximity is detected for this scan because the DC peak exceeds the DC threshold and because the slope of the AC signal on the LHS and RHS of the DC peak indicates an AC minima has occurred at the DC peak.

When using the sensor with the detector circuit of FIG. 2, the DC offset from the sensor output of FIG. 1 is typically adjusted to 2 volts. This value may change depending upon the background field strength in the area; but its level should be adjusted to avoid any clipping by the detector and to provide the best linear response as the screened object approaches the sensor. The A/D sample frequency is typically 1 kHz. Since the output of the detector is adjusted to allow for maximum A/D voltage resolution. The change in the output from the detector is indicative of proximity, and high sensitivity results with much preamp gain in the digitizer. Hence, for high gain and hence increased detection range, the output of the detector needs nulled precisely so the DC component does not saturate the A/D.

For digitization preamplifier gains between 1 and 10, the proximity range is about 1 foot in the above case. Because the scan range is small, it is easy to visually associate the observed proximity signal with the scanned object. When scanning with a wand detector it is easy to repeat measurements by sweeping the wand to and fro over the surface of the object.

To detect charge and proximity, we move the sensor close to the scanned object and expect to observe a monotonic DC offset superposed on the proximity signal. As the proximity signal indicates the sensor is approaching the object, a DC offset begins to increase in unison. These two criterions make the signal easy to recognition, and provide an unambiguous observation of the existence of static charge on an object. Repeating the measurement with the same result reduces the false alarm rate due to non-static noise coming from outside the proximity range. The same procedure described above is used with a wand plastic detector but the observation of both criterions is required to indicate a concealed plastic material.

In conclusion, we see the invention eliminates the charge-proximity ambiguity by recognizing signal criterions appearing in two frequency bands. One band is in the approximate frequency range from DC to 10 Hz range and the other in the 50–60 Hz range. This dual band process allows for simultaneous measurement of charge and proximity in a signal type of E-field measurement.

The invention claimed is:

1. A passive proximity sensor for sensing motion of charged and uncharged objects relative to the sensor, comprising:
   means for sensing an AC background electric field of a particular frequency range;
   means for detecting changes in the strength of the sensed AC background electric field, decreases and increases in the sensed AC background electric field indicating proximity of an object relative to the sensor;
   means for simultaneously sensing a substantially DC electric field; and
   means for detecting the sensed substantially DC electric field, presence of a sensed substantially DC electric field in combination with detected changes in the sensed AC background electric field indicating proximity of a charged object relative to the sensor.

2. A passive proximity sensor for sensing motion of charged and uncharged objects relative to the sensor, according to claim 1, wherein the AC background electric field of a particular frequency range is established by one of electric power wiring, operating machinery, an electrical device, and combinations thereof.

3. A passive proximity sensor for sensing motion of charged and uncharged objects relative to the sensor, according to claim 1, wherein the AC background electric field of a particular frequency range is established by a potential modulator.

4. A passive proximity sensor for sensing motion of charged and uncharged objects relative to the sensor, according to claim 3, wherein the potential modulator modulates the generation of the AC background electric field.

5. A passive proximity sensor for sensing motion of charged and uncharged objects relative to the sensor, according to claim 3, wherein the potential modulator modulates the AC background electric field sensed.

6. A passive proximity sensor for sensing motion of charged and uncharged objects relative to the sensor, according to claim 3, wherein the potential modulator modulates the AC background electric field sensed by periodically grounding the object.

7. A passive proximity sensor for sensing motion of charged and uncharged objects relative to the sensor, according to claim 3, wherein the potential modulator provides markers on the sensed AC background electric field.

8. A passive proximity sensor for sensing motion of charged and uncharged objects relative to the sensor, according to claim 7, wherein the markers indicate time.

9. A passive proximity sensor for sensing motion of charged and uncharged objects relative to the sensor, according to claim 7, wherein the markers identify the object.

10. A passive proximity sensor for sensing motion of charged and uncharged objects relative to the sensor, according to claim 1, wherein the particular frequency range is between about fifty and about sixty hertz and the AC background electric field is an AC background noise field.

11. A passive proximity sensor for sensing motion of charged and uncharged objects relative to the sensor, according to claim 1, wherein the means for detecting the substantially DC electric field detects sensed electric fields in the frequency range of about zero hertz to about ten hertz.

12. A passive proximity sensor for sensing motion of charged and uncharged objects relative to the sensor, according to claim 1, wherein the means for detecting changes in the strength of the sensed AC background electric field produces electrical signals indicative of the detected AC electrical fields, wherein the means for detecting the sensed substantially DC electric field produces electrical signals indicative of the detected DC electrical fields, and additionally including means receiving both the electrical signals indicative of the detected AC electrical fields and the electrical signals indicative of the detected DC electrical fields and through signal characteristic recognition produces an output indication of proximity of an object with respect to the sensor and whether the object carries a charge.

13. A passive proximity sensor for sensing motion of charged and uncharged objects relative to the sensor, according to claim 12, wherein the indication of the proximity of an object with respect to the sensor and whether the object carries a charge is an audible indication.

14. A passive proximity sensor for sensing motion of charged and uncharged objects relative to the sensor, according to claim 12, wherein the indication of the proximity of an object with respect to the sensor and whether the object carries a charge is a visual indication.

15. A passive proximity sensor for sensing motion of charged and uncharged objects relative to the sensor, according to claim 12, wherein the indication of the proximity of an object with respect to the sensor and whether the object carries a charge is a visual display showing the combined electrical signals indicative of the detected AC electrical fields and of the detected DC electrical fields.

16. A passive proximity sensor for sensing motion of charged and uncharged objects relative to the sensor, according to claim 12, wherein the signal characteristic recognition is performed by a computer according to a signal characteristic recognition program.

17. A passive proximity sensor for sensing motion of charged and uncharged objects relative to the sensor, according to claim 12, wherein the means for detecting changes in the strength of the sensed AC background electric field and producing electrical signals indicative of the detected AC electrical fields includes means for increasing the frequency of the signals indicative of the detected AC electrical fields above the particular frequency range of the AC background electric field.

18. A passive proximity sensor for sensing motion of charged and uncharged objects relative to the sensor, according to claim 12, wherein objects are scanned to determine the presence of charge therein, additionally including means for moving objects to be scanned toward and away from the means for sensing the AC background electric field and the means for simultaneously sensing the substantially DC electric field.

19. A passive proximity sensor for sensing motion of charged and uncharged objects relative to the sensor, according to claim 1, wherein objects are scanned to determine the presence of charge therein, additionally including means for moving objects to be scanned toward and away from the means for sensing the AC background electric field and the means for simultaneously sensing the substantially DC electric field.

20. A passive proximity sensor for sensing motion of charged and uncharged objects relative to the sensor, according to claim 1, additionally including means for moving one of the object, the sensor, and the origin of the background electric field relative to the other, and further additionally including means for detecting changes in the sensed substantially DC electric field with the movement of the one of the object, the sensor, and the origin of the background electric field relative to the other, presence of a sensed substantially DC electric field and changes in the sensed DC electric field indicating presence of dielectric materials within the object and dielectric variations within the object.

21. A passive proximity sensor for sensing motion of charged and uncharged objects relative to the sensor, according to claim 20, wherein the object is a living body and the dielectric variations detected represent internal body parts.

22. A passive proximity sensor for sensing motion of charged and uncharged objects relative to the sensor, according to claim 21, additionally including means to process the dielectric variations detected into images.

23. A passive proximity sensor for sensing motion of charged and uncharged objects relative to the sensor, according to claim 20, wherein the object is being scanned for hidden items and the dielectric variations detected represent hidden items.

24. A passive proximity sensor for sensing motion of charged and uncharged objects relative to the sensor to create an image of dielectric variations within the object, comprising:

means for generating an AC background electric field of a particular frequency range;

means for sensing the AC background electric field of the particular frequency range;

means for passing the item between the means for generating an AC background electric field of a particular frequency range and the means for sensing the AC background electric field of the particular frequency range;

means for detecting changes in the strength of the sensed AC background electric field;

means for simultaneously sensing a substantially DC electric field; and means for detecting the sensed substantially DC electric field and changes in the sensed substantially DC electric field, presence of a sensed substantially DC electric field and changes in the sensed DC electric field indicating dielectric variations within the object.

25. A passive proximity sensor for sensing motion of charged and uncharged objects relative to the sensor to create an image of dielectric variations within the object, according to claim 24, wherein the object is a living body and the dielectric variations detected represent internal body parts.

26. A passive proximity sensor for sensing motion of charged and uncharged objects relative to the sensor to create an image of dielectric variations within the object, according to claim 25, additionally including means to process the dielectric variations detected into images.

27. A passive proximity sensor for sensing motion of charged and uncharged objects relative to the sensor to create an image of dielectric variations within the object, according to claim 24, wherein the object is being scanned for hidden items and the dielectric variations detected represent hidden items.

28. A passive proximity sensor for sensing motion of charged and uncharged objects relative to the sensor to create an image of dielectric variations within the object, according to claim 27, additionally including means to process the dielectric variations detected into images.

* * * * *